United States Patent
Krumbeck et al.

[11] Patent Number: 6,119,818
[45] Date of Patent: Sep. 19, 2000

[54] DISK BRAKE

[75] Inventors: Markus Krumbeck; Stefan Ruckh, both of Bad Urach, Germany

[73] Assignee: Gustav Magenwirth GmbH & Co., Bad Urach, Germany

[21] Appl. No.: 09/324,678

[22] Filed: Jun. 3, 1999

Related U.S. Application Data

[63] Continuation of application No. PCT/EP99/01444, Mar. 5, 1999.

[30] Foreign Application Priority Data

Mar. 13, 1998 [DE] Germany ............................ 198 10 685

[51] Int. Cl.$^7$ .................................. B62L 3/02; B62L 1/00; F16D 55/224; F16D 65/12
[52] U.S. Cl. ..................................... 188/24.22; 188/24.12; 188/26; 188/344
[58] Field of Search ....................... 188/26, 24.11–24.22, 188/370, 344, 71.1, 73.46, 73.37, 73.32, 249, 259, 250 E, 196 V, 196 M, 71.7–71.9, 171, 163, 218 XL

[56] References Cited

U.S. PATENT DOCUMENTS

| | | |
|---|---|---|
| 2,608,275 | 8/1952 | Hobbs . |
| 3,090,468 | 5/1963 | Rucker . |
| 3,659,685 | 5/1972 | Stipanovic ............................ 188/71.8 |
| 4,072,216 | 2/1978 | Haraikawa ........................... 188/23.32 |
| 4,596,313 | 6/1986 | Metoyer . |
| 4,619,347 | 10/1986 | Schreiner et al. . |
| 4,684,838 | 8/1987 | Casanova ............................. 188/71.1 |
| 4,712,654 | 12/1987 | Temple et al. ....................... 188/71.8 |
| 5,086,885 | 2/1992 | Bowsher .............................. 188/71.9 |
| 5,358,078 | 10/1994 | Gajek et al. ......................... 188/26 |
| 5,443,134 | 8/1995 | Gajek et al. ......................... 188/344 |
| 5,632,362 | 5/1997 | Leitner . |
| 5,950,772 | 9/1999 | Buckley et al. ...................... 188/26 |

FOREIGN PATENT DOCUMENTS

| | | |
|---|---|---|
| 2.032.528 | 11/1970 | France . |
| 591 787 | 1/1934 | Germany . |
| 1 152 626 | 11/1959 | Germany . |
| 42 22 044 | 1/1994 | Germany . |
| 19810685 | 11/1999 | Germany . |
| 49-54-244 | 5/1974 | Japan . |

(List continued on next page.)

OTHER PUBLICATIONS

Japanese Patent Application No. 59–86724, filed May 19, 1984.

Instructions for Disk Brakes, Shimano Sales Corporation, Sun Valley, California (Applicant believes that these instructions were packaged with the brakes as early as 1974).

Bicycle Parts, Shimano Sales Corporation, Sun Valley, California, 1978.

*Primary Examiner*—Douglas C. Butler
*Attorney, Agent, or Firm*—Barry R. Lipsitz; Douglas M. McAllister

[57] ABSTRACT

In order to provide a disk brake for vehicles, comprising a brake disk securely connectable to a hub, a brake caliper engaging over the brake disk on oppositely located sides, at least one first brake lining movable in the direction of the brake disk in relation to the brake caliper and at least one second brake lining arranged on the brake caliper so as to be non-displaceable, with which the brake linings do not touch the brake disk in the non-actuated state, it is suggested that the brake caliper be arranged so as to be fixed in a defined geometrical correlation to the hub, that the brake caliper be positioned in relation to the brake disk when the disk brake is not actuated such that a gap exists between the brake linings and the brake disk, and that when the disk brake is actuated the first brake lining act on the brake disk in such a manner that an outer ring of the brake disk acted upon by the first brake lining moves in the direction of the second brake lining under elastic deformation of the brake disk and abuts on the second brake lining.

24 Claims, 2 Drawing Sheets

FOREIGN PATENT DOCUMENTS

| | | |
|---|---|---|
| 49-54245 | 5/1974 | Japan . |
| 49-73143 | 6/1974 | Japan . |
| 50-2054 | 1/1975 | Japan . |
| 1 207 328 | 9/1970 | United Kingdom . |
| 2 125 126 | 2/1984 | United Kingdom . |
| WO 99/10225 | 3/1999 | WIPO . |
| 9947409 | 9/1999 | WIPO . |

DISK BRAKE

This application is a continuation of PCT/EP99/01444 filed Mar. 5, 1999.

The invention relates to a disk brake for vehicles, in particular, bicycles, comprising a brake disk securely connectable to a hub, a brake caliper engaging over the brake disk on oppositely located sides, at least one first brake lining arranged on the one side of the brake disk and movable in the direction of the brake disk in relation to the brake caliper during the actuation of the disk brake and at least one second brake lining arranged on the other side of the brake disk on the brake caliper so as to be non-displaceable in the direction of the brake disk.

A disk brake of this type is known, for example, from DE 42 22 044 A1. The brake caliper in this disk brake is mounted for displacement in a guide cylinder. The position of the brake caliper may be adjusted such that the brake linings do not rub on the brake disk when the brake is not actuated but the construction is complicated on account of the guide surfaces, which have to be machined exactly, and consequently expensive and, in addition, susceptible to malfunctions with regard to wear and tear and soiling on account of the off-center mounting caused by the construction.

A further solution of a disk brake is known from U.S. Pat. No. 5,632,362. In this case, the brake caliper is mounted on bolts in a known manner so as to be displaceable. The brake linings are kept apart by means of a spring but the position of the brake caliper is not defined when the brake is not actuated but left to chance, as a result of which one or other of the brake linings can touch the disk. This is not acceptable to cyclists on account of the relatively low human power and on account of the rubbing noise.

Furthermore, a brake for motor vehicles is known from DE 591 787, with which a stationary and a movable brake ring are provided which act on a brake disk which, for its part, bears brake linings.

The braking surfaces are thereby movable towards one another, wherein the brake disk alters its axial position on the drive shaft.

Furthermore, the brake disk is of a flexible design, wherein the flexibility of the brake disk serves to abut the brake linings first of all partially on the braking surfaces and not achieve a full abutment of the brake linings on the braking surfaces until the braking surfaces increasingly move relative to one another.

A further brake in accordance with the type of brake described above is known from U.S. Pat. No. 2,608,275 and likewise works on the principle that the brake disk is seated on the shaft bearing it so as to be axially displaceable. This brake is intended for transmissions of motor vehicles.

Proceeding on the basis of DE 42 22 044 A1, the object underlying the invention is to provide a disk brake which is simple in its construction and not susceptible to malfunctions and with which the brake linings do not touch the brake disk in the non-actuated state.

This object is accomplished in accordance with the invention, in a disk brake of the type described at the outset, in that the brake caliper is arranged so as to be fixed in a defined geometrical correlation to the hub, that the brake caliper is positioned in relation to the brake disk, when the disk brake is not actuated, such that a gap exists between the first brake lining and the brake disk as well as between the second brake lining and the brake disk and that when the disk brake is actuated the first brake lining acts on the brake disk in such a manner that an outer ring of the brake disk acted upon by the first brake lining moves in the direction of the second brake lining under elastic deformation of the brake disk and abuts on the second brake lining.

The advantage of the inventive solution is thus to be seen in the fact that both the brake disk and the brake caliper are securely connected to the vehicle members supporting them and no elements are required which allow a displacement of the brake caliper relative to the brake disk or a displacement of the brake disk relative to the stationary brake caliper.

The inventive solution allows, in particular, an especially simple construction, with which malfunctions as a result of environmental influences are ruled out.

In addition, the geometrical correlation of the parts, i.e. of the brake disk in relation to the brake caliper and brake linings, is well-defined and so the brake linings are always spaced in relation to the brake disk and do not rub on it.

The use of the elastic deformability of the brake disk for bridging the gap between the second brake lining and the brake disk is one of the essential ideas of the invention. The bending stress resulting from the slight deformation, particularly in the crosspieces of the brake disk, is far below the admissible value which has also been confirmed in all drive and bench tests.

In principle, it would be conceivable with the inventive solution to arrange the brake caliper on optional parts of the vehicle as long as this is arranged so as to be fixed in a defined alignment in relation to the brake disk. A particularly favorable solution, in particular, for bicycles provides for the brake caliper to be securely connected to a frame member bearing the hub.

With respect to the mounting of the hub relative to the frame member, all solutions are conceivable which position the hub so as to be axially non-displaceable relative to the frame member. In this case, for example, a direct support of the hub relative to the frame member is also conceivable. A particularly favorable solution provides for the hub to be mounted on the frame member so as to be rotatable and axially non-displaceable on an axle stationary with respect to the frame. Such a solution has proven to be extremely favorable, in particular, for bicycles since a simple, axially non-displaceable, rotatable mounting of the hub is possible on the axle stationary with respect to the frame.

With respect to the arrangement of the brake linings, the most varied of solutions are conceivable. It would, for example, be conceivable to arrange the brake linings directly on elements bearing them. A particularly favorable solution provides for the disk brake to have a first and a second brake pad which bear the first and second brake linings, respectively. This solution has the advantage that a brake pad of this type can be interchanged and thus a replacement thereof is also possible in a simple manner when the brake linings become worn.

With respect to the fixing of the brake linings to the parts of the disk brake bearing them, the most varied of solutions are conceivable. For example, a secure mechanical fixing is advantageous. A particularly favorable solution, especially with respect to the interchangeability of the brake pads, provides for the brake pads to be held in abutment on the members supporting them by means of permanent magnets and thus for it also to be ensured, in particular, during the movement of the brake pads into their non-actuated position that the brake pads are positioned with the desired gap relative to the brake disk and remain in this position.

It is particularly favorable, in particular, when the permanent magnets are intended to hold the brake pads in their positions, when the brake pads have steel plates as carrier plates which ensure a high interactive force with the permanent magnets on account of their magnetizability.

A particularly favorable solution with the use of permanent magnets provides for at least one of the permanent magnets to be arranged eccentrically to the member supporting it. In this case, an asymmetric, i.e., eccentric action of force is ensured between the permanent magnet and the brake pad which may be used, for example, to inhibit any relative rotation between the brake pad and the member supporting the permanent magnet.

Since the brake pads are subject to thermal stresses, particularly during long braking, and thus the heating up of the brake pads could also have an effect on the additional parts of the disk brake, it is preferably provided for the members of the disk brake supporting the brake pads to be insulated thermally in relation to the brake pads, i.e. the transfer of heat from the brake pads to these members supporting the brake pads is decreased and thus any heating up of these parts can at least be reduced.

With respect to the installation of the brake pads, it has proven to be particularly advantageous when the two brake pads can be assembled through an opening of the brake caliper arranged laterally next to the brake disk so that a simple interchange of the brake pads is possible when the brake linings are worn without any additional disassembly of the brake caliper.

A particularly favorable solution provides for the opening to be arranged in axial direction of the piston, preferably coaxially to it.

With respect to how the movability of the first brake lining relative to the brake disk in the direction towards the second brake lining is intended to be realized, no further details are given in conjunction with the preceding embodiments. It would, for example, be conceivable to move the first brake lining in the direction of the second brake lining by means of an eccenter or a cam disk.

A particularly favorable solution does, however, provide for the first brake lining to be movable in the direction of the brake disk by way of a piston arranged in the brake caliper and actuatable hydraulically.

When providing such a hydraulically movable piston, care is to be taken that when the disk brake is not actuated this piston takes up a position, in which the brake lining acted upon by this piston is prevented from rubbing on the brake disk.

It would, for example, be conceivable for this purpose to act directly on the brake lining. However, a solution which can be realized particularly easily provides for the piston to be acted upon in the direction of a non-actuated position by means of a spring and thus when the disk brake is not actuated to be in the non-actuated position which is defined in accordance with the invention such that the brake lining which can be acted upon by the piston does not rub on the brake disk but the desired gap exists between this and the brake disk.

In order to avoid any thermal stressing of the piston and thus of the sealing of the piston in the housing and also the hydraulic medium, in particular, when a hydraulically actuatable piston is provided, it is preferably provided for the piston to act on the first brake lining via a thermally insulated element.

This solution may be realized in a particularly simply manner from a constructional point of view in that a ring consisting of heat-insulating material is arranged between the piston and a first brake pad surrounding the first brake lining.

In order to ensure, in particular, when the piston is acted upon in the direction of its non-actuated position by means of a spring that the first brake lining will follow the movement of the piston, it is provided for the brake pad to be acted upon in the direction of an abutment on the piston supporting it by means of a permanent magnet.

With respect to the arrangement of the second brake lining on the brake caliper, no further details have so far been given. One advantageous embodiment, for example, provides for the second brake lining to be held by a member securely insertable into the brake caliper.

In this respect, the member is preferably designed such that it is insertable into a recess in the brake caliper adjoining the opening for the insertion of the brake linings. This solution combines in a particularly simple manner the advantageous assembly of both brake pads though one opening with a constructionally simple solution for the positioning of the brake pad supporting the second brake lining.

This may be realized in a particularly simple manner from a constructional point of view when the member is designed as a threaded disk which can be screwed into the recess.

In order, on the one hand, to insulate the threaded disk thermally in relation to the second brake lining, it is preferably provided for the threaded disk to have an outer edge, on which the second brake pad abuts and which positions the second brake pad in a gap of air relative to the permanent magnet holding the brake pad so that the permanent magnet, in particular, is also not subjected to any heat stressing.

Since it is of great significance within the scope of the inventive solution to maintain a gap between the brake linings and the brake disk in the non-actuated position of the brake disk, it is preferably provided for the first brake lining to be positionable in a defined geometrical correlation to the brake disk by means of an adjusting device. Such an adjusting device, provided, in particular, on the brake caliper, allows a gap to be set exactly in a desired manner even with a rough preliminary positioning of the brake caliper.

This may be realized in a particularly simple manner from a constructional point of view when the adjusting device comprises an adjusting screw which serves as a stop for the piston and is adjustable relative to the housing.

Such an adjusting screw may be advantageously utilized, in addition, in an inventive manner to the extent that a pressure chamber between the housing and the piston can be filled with hydraulic medium and/or vented with it. For this purpose it is provided for the adjusting screw to be provided with a closable venting bore.

In addition to the exact positioning of the first brake lining by means of an adjusting device, it is also preferably provided for the second brake lining to be positionable in a defined geometrical correlation relative to the brake disk by means of an adjusting device so that the exact positioning of the brake lining relative to the brake disk is possible even with a rough positioning of the brake caliper relative to the brake disk.

Altogether, the positioning of the brake linings by means of an adjusting device is already of advantage since the brake linings become worn and thus a readjustment of the brake linings, depending on the degree of their wear and tear, allows the adaptability of the inventive disk brake with the desired precision with respect to the response of the brake to be realized in a simple manner.

Such an adjustment for the second brake lining may be realized particularly advantageously in that the adjusting device comprises a threaded element adjustable relative to the housing.

An additional, advantageous embodiment of an inventive disk brake provides for spaces existing between the brake disk and the housing of the brake caliper to be smaller than the thickness of the carrier plates of the brake pads so that it is ensured that the carrier plates are always held securely in the housing, irrespective of the wear and tear of the brake linings supported by them.

Additional features and advantages of the invention are the subject matter of the following description as well as the drawings illustrating one embodiment. In the drawings.

Figure 1:
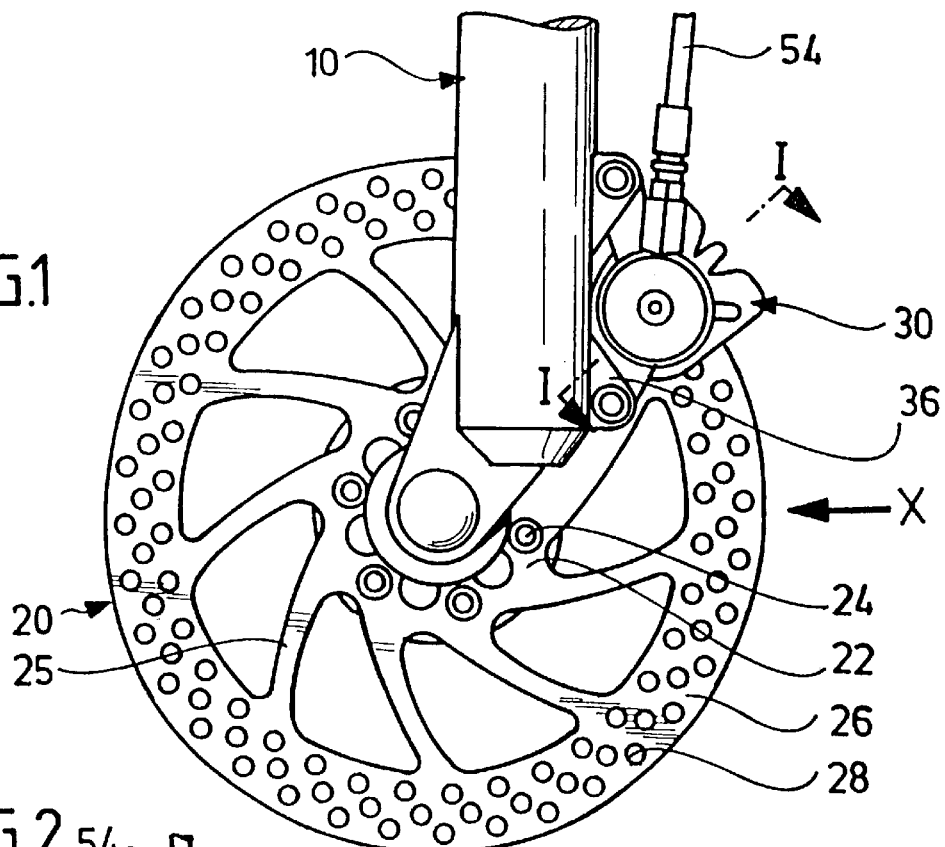
FIG. 1 shows a side view of an inventive disk brake, mounted on a fork of a bicycle.

A spring fork of a bicycle representing a frame member 10 of a vehicle bears an axle 12 which is arranged to be stationary in relation to the frame and on which a hub 14 of a wheel 16 is rotatable about an axis of rotation 18 but is mounted so as to be axially non-displaceable with respect to the frame member 10.

A brake disk designated as a whole as 20 is securely connected to this hub 14 so that the brake disk 20 is also rotatable about the axis of rotation 18 with the hub 14 in a defined geometrical alignment in relation to the frame member 10.

The brake disk 20 comprises, as illustrated in FIG. 1, an inner ring 22 which is screwed to the hub 14, for example, by means of screws 24 as well as an outer ring 26 which is connected to the inner ring 24 via crosspieces 25 and is, in the simplest case, of a solid design. The outer ring 26 is, however, preferably provided, as illustrated in FIG. 1, with bores 28 or openings of a different shape which serve primarily to reduce the weight of the outer ring 26.

A brake caliper designated as a whole as 30 is securely connected to the frame member 10. This brake caliper 30 comprises a housing 32 enclosing the brake disk 20 and having a slot-like recess 34 which is open towards the axle 12 or axis of rotation 18 and through which the outer ring 26 of the brake disk 20 can be moved when the brake disk 20 rotates about the axis of rotation 18.

The housing 32 is preferably designed such that it can be screwed to flanges 36 present on the frame member 10 and can thus be securely connected to the frame member 10.

The housing 32 has in its housing portion 38 facing away from the wheel 16 a cylindrical bore 40 which is open towards the brake disk 20 and is closed by a rear wall 41 of the housing. A piston designated as a whole as 42 is provided in the cylindrical bore 40 and is mounted in the cylindrical bore 40 for displacement along an axis 44 thereof away from or towards the rear wall 41.

A free space between the piston 42 and the housing portion 38 bearing the cylindrical bore 40 forms a pressure chamber 46 which is sealed by means of a seal 48 towards an open side 50 of the cylindrical bore 40 and thus towards the outside. To prevent any dirt entering, a skimmer 52 is provided, in addition, on a side of the seal 48 facing away from the pressure chamber 46.

Figure 2:
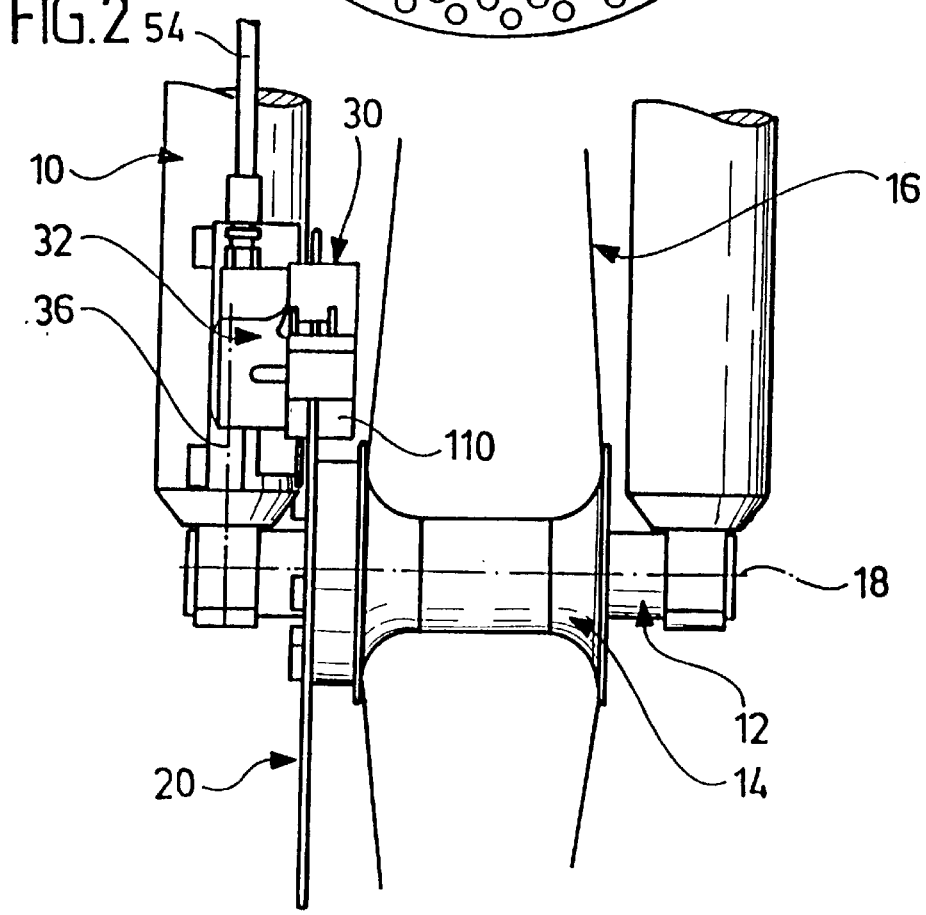
FIG. 2 shows a view in the direction of the arrow X in FIG. 1.
Figure 3:
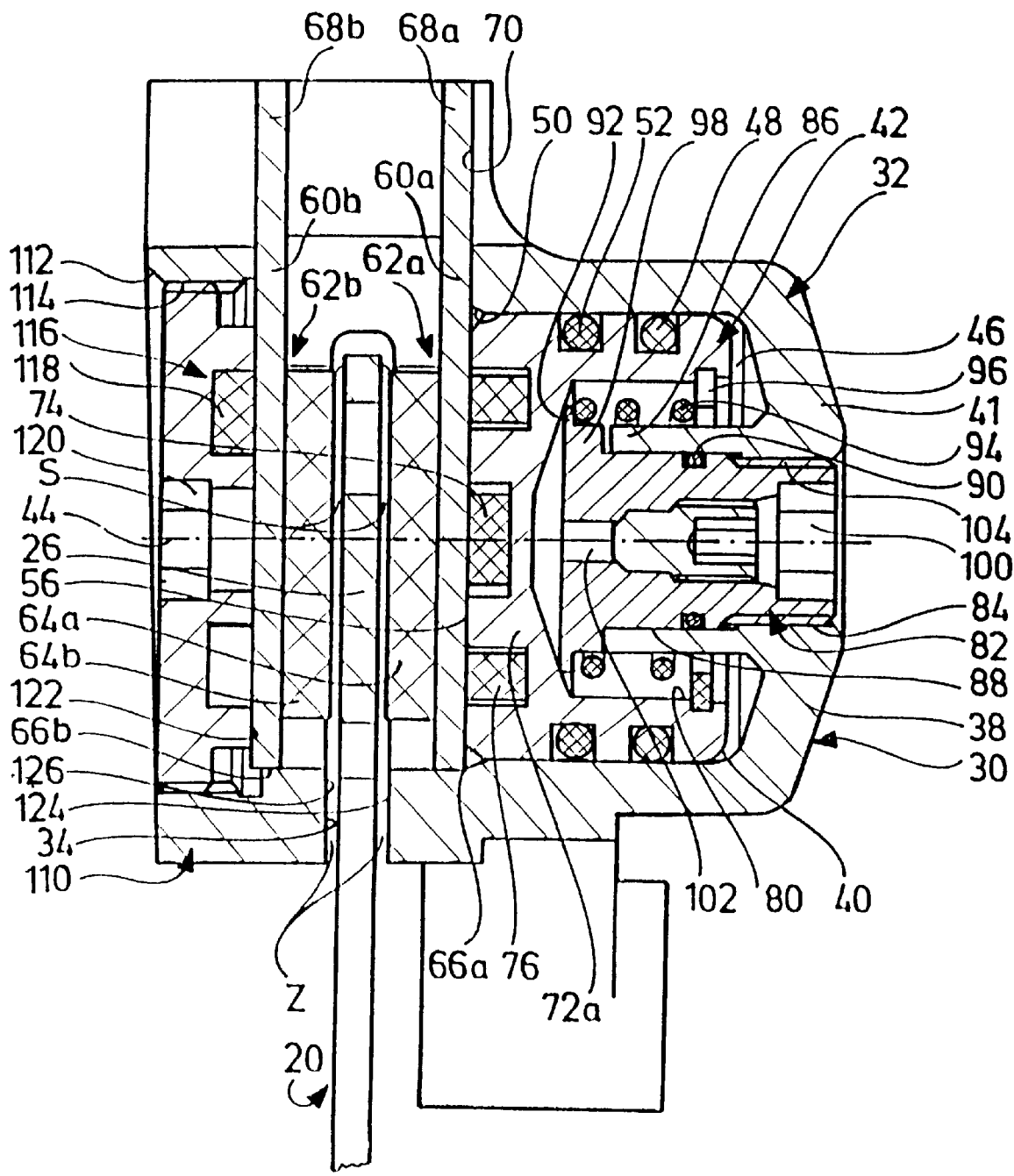
FIG. 3 shows a section along line I—I in FIG. 1.

In order to move the piston 42, the pressure chamber 46 is, as illustrated in FIGS. 1 and 2, connected via a line 54 to a pressure generator not illustrated in the drawings, for example, a manually actuatable main brake cylinder, wherein the main brake cylinder acts hydraulically on the pressure chamber 46.

The piston 42 has an outer piston end face 56 and abuts with this on a carrier plate 60a of a first brake pad 62a. The first brake pad 62a comprises, in addition, apart from the carrier plate 60a a brake lining 64a securely connected to the carrier plate 60a.

Furthermore, the carrier plate 60a is provided with an essentially round, outer contour 66a and is preferably guided with this outer contour 66a by the housing 32 in the direction transversely to the axis 44 of the bore 40, whereby the forces resulting during braking and acting on the brake pad 62a are absorbed.

In addition, the outer contour 66a of the carrier plate 60a is provided at one point of its circumference with a radial extension 68a which extends outwards through a corresponding opening 70 of the housing 32 so that the brake pad 62a cannot turn in the housing 32. The securing of the brake pad 62a against turning can, however, also be realized by other geometrical shapes which prevent any turning thereof.

The carrier plate 60a is preferably produced from steel. A permanent magnet 74 arranged in a piston base 72 so as to be secured close to the piston end face 66a attracts the carrier plate 60a and with it the brake pad 62a as well and thus gives not only the carrier plate 60a but also the brake pad 62a a defined position with respect to the piston 42.

Furthermore, in a preferred variation of the inventive solution a ring 76 consisting of thermally insulating material is also placed in the piston base 72a and this ring protrudes in the direction of the carrier plate 60a in relation to the piston end face 66a in order to reduce any transfer of heat from the brake pad 62a to the piston 42.

The piston 42 has, in addition, on the side of the pressure chamber a bore 80, into which an adjusting screw 82 projects. The adjusting screw 82 thereby penetrates the rear wall 41 of the housing 32 and is also held in the rear wall 41 so as to be adjustable in the direction of the axis 44 of the bore 40 via a thread 84, wherein the rear wall 41 guides the adjusting screw 82 by means of an integral cylinder sleeve 86 in the region of a cylinder attachment 88 of the adjusting screw 82 and a seal 90 for sealing the pressure chamber 46 towards the outside, i.e. against any leakage of hydraulic medium, between the rear wall 41 and the adjusting screw 82 is provided between the cylinder sleeve 86 and the cylinder attachment 88.

The adjusting screw 82 has, in addition, a collar 92 at its end side which is located in the bore 80 and on which a pressure spring 94 is supported which extends between the collar 92 and a ring 96 which is located between the collar 92 and the rear wall 41 in the bore 80 and is securely arranged in it. This pressure spring 94 presses the piston 42 against one end 98 of the adjusting screw 82 bearing the collar 92 when the inventive disk brake is not actuated by pressure acting on the pressure chamber 46.

For the adjustment of the adjusting screw 82 this is provided with a hexagonal recess 100 which is arranged in the rear wall 41 on a side of the adjusting screw 82 located opposite the end 98 and is accessible from outside the housing 32.

For the purpose of filling or venting the entire braking system with hydraulic medium, the adjusting screw 82 is provided, in addition, with a venting bore 102 which can be closed by means of a sealing screw 104.

One arm 110 of the brake caliper 30 arranged on an inner side of the brake disk 20 facing the wheel 16 and between the brake disk and the wheel 16 is provided with a recess 114 which extends into the arm 110 starting from an opening 112 and is designed as a threaded bore. A threaded disk 116 is arranged in the recess 114 and this bears at least one permanent magnet 118 which is seated on a side facing the brake disk 20 and acts on a carrier plate 60b of a second brake pad 62b which is likewise provided, in addition, with a brake lining 64b. The carrier plate 60b of the brake pad 62b is also held with its outer contour 66b in the arm 110 of the brake caliper 30 against movements transversely to the axis 44 and has, in addition, an extension 68b which fixes the carrier plate 60b in the arm 110 so as to be non-rotatable.

The permanent magnet 118 thereby attracts the carrier plate 60b in the direction of the threaded disk 116 in the same way as the permanent magnet 74.

The second brake pad 62b is preferably identical to the first brake pad 62a in shape and construction.

By rotating the threaded disk 116, preferably via a hexagonal recess 120, the position of the threaded disk 116 can be varied in the direction of the axis 44 of the bore 40 and thus also the distance of the brake lining 64b from the brake disk 20 so that a gap S desired between the non-actuated position of the outer ring 26 of the brake disk 20 and the brake lining 64b can be adjusted exactly.

The permanent magnet 118 is preferably arranged to be eccentric to the threaded bore 114 so that friction occurs between the carrier plate 60b fixed non-rotatably in the arm 110 of the housing 32 on account of the extension 68b and thus also the second brake pad 62b and the threaded disk 116 and this prevents the threaded disk 116 from being able to adjust itself independently in the threaded bore 114 due to turning.

Furthermore, it is preferably suggested that a gap of air be provided, in addition, between the carrier plate 60b and the permanent magnet 118 and, moreover, the carrier plate 60b rest only on an outer edge 162 of the threaded disk 116, whereby the desired friction reaches the greatest possible value.

The threaded bore 114 in the arm 110 is preferably dimensioned such that both brake pads 62a and 62b can be introduced through the threaded bore 114 either when the brake caliper 30 is dismantled or the brake disk 20 removed, i.e. when the brake disk 20 does not engage in the slot-like recess 34.

Furthermore, it is preferably provided for a space Z between the brake disk 20 and wall surfaces 124, 126 of the recess 34 to always be smaller than a thickness of the carrier plates 60a and 60b so that even when the brake linings 64a, 64b are worn down the carrier plates 60a and 60b cannot jam or even be drawn to the outside through the recess 34.

The inventive disk brake operates as follows:

After the brake caliper 30 has been screwed onto the frame member 10, the brake pads 62a and 62b are adjusted by means of the adjusting screw 82 and the threaded disk 116 such that the brake linings 64a and 64b are as close as possible to the brake disk 20 but a gap S exists between them and the brake disk 20 each time and thus the brake linings 64a, 64b and the brake disk 20 do not touch.

Since, as a result, the brake linings 64a and 64b can be positioned relative to the frame member 10 in a defined geometrical position and, on the other hand, the brake disk is also positioned in a defined manner via the hub 14 so as to be axially non-displaceable relative to the frame member 10 in the direction of the axis of rotation 18, the brake disk 20 will always move freely between the brake linings 64a and 64b.

If fluid, i.e. a hydraulic medium, is now conveyed to the pressure chamber 46 via the line 54 due to actuation of the disk brake, for example, due to actuation of the main brake cylinder not shown in the drawings, particularly manually, and the pressure of the hydraulic medium in the pressure chamber 46 is thereby increased, the piston 42 moves contrary to the action of the pressure spring 94 in the direction of the brake disk 20 and first presses the first brake lining 62a against the outer ring 26 of the brake disk 20. The outer ring 26 is then pressed against the second brake lining 64b under elastic deformation of the crosspieces 25 of the brake disk 20, i.e. deformation of the brake disk 20 to one side, namely towards the brake pad 62b. The brake disk 20 is now fixed in its deformed position with the outer ring 26 between the brake linings 64a and 64b, and the braking force can be generated in accordance with the fluid pressure in the pressure chamber 46.

If the braking procedure is terminated due to removal of the pressure in the pressure chamber 46, the pressure spring 94 draws the piston 42 together with the brake pad 62a adhering to it on account of the permanent magnet 74 back to such an extent until the piston 42 abuts on the end 98 of the adjusting screw 82 which represents a stop for the piston 42. The brake disk 20 thus has the possibility of taking up its original, undeformed shape again and thus by forming the gap S between the brake linings 64a and 64b of again moving through these without touching them.

When the brake linings 64a and 64b are worn down, they can again be brought in a simple manner with a conventional tool as a result of readjustment of the adjusting screw 82 and the threaded disk 116 into a position, in which they are located relative to the undeformed brake disk 20 whilst forming the gap S.

What is claimed is:

1. Disk brake apparatus for bicycles, comprising:

a brake disk securely connectable to a hub, a brake caliper engaging over the brake disk on oppositely located sides, the brake caliper being arranged so as to be fixed in a defined geometrical correlation to the hub, said brake caliper comprising a housing having a slot-like recess open towards said hub for receiving said brake disk, a housing portion arranged on one side of said brake disk extending in said slot-like recess and receiving an actuating mechanism, an arm extending on another side of said brake disk extending in said slot-like recess, at least one first brake pad bearing a first brake lining arranged on said one side of the brake disk and movable in the direction of the brake disk in relation to the brake caliper during the actuation of the disk brake apparatus by said actuating mechanism, at least one second brake pad bearing a second brake lining arranged on said another side of the brake disk on said arm of said brake caliper so as to be non-displaceable in the direction of the brake disk, said brake pads being positioned in relation to the brake disk when the disk brake apparatus is not actuated such that a gap exists between the first brake lining and the brake disk as well as between the second brake lining and the brake disk, and when the disk brake apparatus is actuated, the first brake lining acts on the brake disk in such a manner that an outer ring of the brake disk acted upon by the first brake lining moves in the direction of the second brake lining under elastic deformation of the brake disk and abuts on the second brake lining, said arm being provided with a lateral recess extending through said arm and sidewards of said slot-like recess and having an opening facing said brake disk, said two brake pads being adapted to be assembled through said lateral recess, and said second brake pad being carried by a holding member adapted to be fixed to said arm.

2. Disk brake apparatus as defined in claim 1, wherein the brake pads are held in abutment on members by means of permanent magnets, said members being supported by said actuating mechanism and said arm respectively.

3. Disk brake apparatus as defined in claim 2, wherein the brake pads have steel plates as carrier plates for the brake linings.

4. Disk brake apparatus as defined in claim 2, wherein at least one of the permanent magnets is arranged eccentrically to the member supporting it.

5. Disk brake apparatus as defined in claim 1, wherein said actuating mechanism for moving said first brake in the direction of the brake disk comprises a hydraulically actuable piston arranged in the housing portion.

6. Disk brake apparatus as defined in claim 5, wherein the piston is acted upon in the direction of a non-actuated position by means of a spring.

7. Disk brake apparatus as defined in claim 5, wherein the piston acts on the first brake lining via a thermally insulating element.

8. Disk brake apparatus as defined in claim 5, wherein the first brake pad is held in abutment on said piston by means of a permanent magnet.

9. Disk brake apparatus as defined in claim 1, wherein the second brake pad is held by a member adapted to be securely inserted into said lateral recess of said brake caliper.

10. Disk brake apparatus as defined in claim 9, wherein said member comprises a threaded disk adapted to be screwed into said lateral recess.

11. Disk brake apparatus as defined in claim 10, wherein said threaded disk has an outer edge, the second brake pad abutting on said edge, and said edge positioning said second brake pad relative to the permanent magnet holding the brake pad with a gap of air.

12. Disk brake apparatus for bicycles, comprising:
a brake disk securely connectable to a hub,
a brake caliper engaging over the brake disk on oppositely located sides,
the brake caliper being arranged so as to be fixed in a defined geometrical correlation to the hub,
said brake caliper comprising a housing having a slot-like recess open towards said hub for receiving said brake disk,
a housing portion arranged on one side of said brake disk extending in said slot-like recess and receiving an actuating mechanism,
an arm extending on another side of said brake disk extending in said slot-like recess,
at least one first brake pad bearing a first brake lining arranged on said one side of the brake disk and movable in the direction of the brake disk in relation to the brake caliper during the actuation of the disk brake apparatus by said actuating mechanism,
at least one second brake pad bearing a second brake lining arranged on said another side of the brake disk on said arm of said brake caliper so as to be non-displaceable in the direction of the brake disk,
said brake pads being positioned in relation to the brake disk when the disk brake apparatus is not actuated such that a gap exists between the first brake lining and the brake disk as well as between the second brake lining and the brake disk, and
when the disk brake apparatus is actuated, the first brake lining acts on the brake disk in such a manner that an outer ring of the brake disk acted upon by the first brake lining moves in the direction of the second brake lining under elastic deformation of the brake disk and abuts on the second brake lining,
a thermally insulating element provided between said first brake pad and said actuating mechanism and supporting said first brake pad,
a permanent magnet arranged on said actuating mechanism and maintaining said first brake pad in abutment with said thermally insulating element.

13. Disk brake apparatus as defined in claim 12, wherein said second brake pad is held in abutment with a member arranged on said arm by a permanent magnet.

14. Disk brake apparatus as defined in claim 13, wherein said second brake pad is thermally isolated with respect to said member.

15. Disk brake apparatus as defined in claim 14, wherein said second brake pad is thermally isolated with respect to said member by an air gap provided therebetween.

16. Disk brake apparatus as defined in claim 14, wherein said second brake pad is adjustable with respect to said arm of said caliper by a second adjusting mechanism acting on said member.

17. Disk brake apparatus as defined in claim 16, wherein said second adjusting mechanism for the second brake pad comprises a member adapted to be securely inserted into a lateral recess extending in said arm sidewards of said slot-like recess.

18. Disk brake apparatus as defined in claim 17, wherein said member comprises a threaded disk adapted to be screwed into said recess.

19. Disk brake apparatus as defined in claim 17, wherein said member has an outer edge, the second brake pad abutting on said edge, and said edge positioning said second brake pad relative to a permanent magnet holding the brake pad with a gap of air.

20. Disk brake apparatus as defined in claim 12, wherein said first brake pad is adjustable with respect to said housing portion of said caliper by a first adjusting mechanism acting an said actuating mechanism.

21. Disk brake apparatus as defined in claim 12, wherein said actuating mechanism for moving said first brake in the direction of the brake disk comprises a hydraulically actuable piston arranged in said housing portion.

22. Disk brake apparatus as defined in claim 21, wherein the piston is acted upon in the direction of a non-actuated position by means of a spring.

23. Disk brake apparatus as defined in claim 22, wherein said adjusting device comprises an adjusting screw serving as a stop for a hydraulically actuable piston arranged in the brake caliper, said adjusting screw being adjustable relative to said housing portion.

24. Disk brake apparatus as defined in claim 23, wherein said adjusting screw is provided with a closable venting bore.

* * * * *